(12) United States Patent
Bruelle-Drews (10) Patent No.: US 7,177,762 B2
(45) Date of Patent: Feb. 13, 2007

(54) NAVIGATION SYSTEM WITH VOICE OUTPUT CONTROL

(75) Inventor: Christian Bruelle-Drews, Hamburg (DE)

(73) Assignee: Harman/Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 10/976,582

(22) Filed: Oct. 29, 2004

(65) Prior Publication Data

US 2005/0149252 A1    Jul. 7, 2005

(30) Foreign Application Priority Data

Oct. 29, 2003  (EP) ................... 03024968

(51) Int. Cl.
  *G08G 1/0968*  (2006.01)
  *G01C 21/34*   (2006.01)
  *G01C 21/36*   (2006.01)
(52) U.S. Cl. ..................................... 701/211
(58) Field of Classification Search ............. None
    See application file for complete search history.

(56) References Cited

U.S. PATENT DOCUMENTS

| | | | |
|---|---|---|---|
| 5,177,685 A * | 1/1993 | Davis et al. | 455/456.5 |
| 5,410,486 A * | 4/1995 | Kishi et al. | 701/211 |
| 5,475,599 A | 12/1995 | Yokoyama et al. | |
| 5,809,447 A * | 9/1998 | Kato et al. | 701/211 |
| 6,185,503 B1 * | 2/2001 | Sumizawa | 701/209 |
| 6,594,580 B1 * | 7/2003 | Tada et al. | 701/211 |
| 6,807,482 B2 * | 10/2004 | Utsumi | 701/209 |
| 6,901,330 B1 * | 5/2005 | Krull et al. | 701/211 |
| 2002/0040272 A1 | 4/2002 | Nagasaka et al. | |

FOREIGN PATENT DOCUMENTS

EP    0 588 086 A1    3/1994
EP    0 854 352 A2    7/1998

* cited by examiner

Primary Examiner—Michael J. Zanelli
(74) Attorney, Agent, or Firm—The Eclipse Group LLP (57) ABSTRACT

The invention relates to a navigation system for vehicle having a position detector for detecting the position of the vehicle, memory for storing a route description to a predetermined destination, voice output device for outputting driving indications by voice output and/or for informing the user of the navigation system of any other operation of the navigation system by voice output, a controller for controlling the voice output device, and further including a selection device for presetting a condition under which the controller enables or disables the voice output of the voice output device.

24 Claims, 6 Drawing Sheets

| trafte | Wegpunkt | Gesamt km | Fahrzeit |
|---|---|---:|---:|
| Wendenstra1e | Hamburg | 0.0 | 00:00 |
| Heidenkampsweg | Hamburg | 0.2 | 00:01 |
| Schwarze BrUcke | Hamburg | 0.9 | 00:01 |
| Heidenkampsweg | Hamburg | 0.9 | 00:01 |
| BilihomerBruckenstrafe | Hamburg | 1.0 | 00:01 |
| Neue Elbbrucke | Hamburg | 2.0 | 00:03 |
| Veddeler BruckenstraCie | Hamburg | 2.3 | 00:03 |
| A255 | AS Hamburg-Veddel | 2.6 | 00:04 |
| AI | AK Hamburg-SUd | 6.0 | 00:06 |
| A7 | AD Horster Dreieck | 21.0 | 00:14 |
| A5 | AS Alsfeid-Ost | 386.6 | 03:34 |
| A67 | Autobahnanschlu6stelle | 516.5 | 04:46 |
| A6 | AD Viemheimer Dreieck | 551.0 | 05:04 |
| AS | AK Walldorf | 582.7 | 05:22 |
| A8 | AD Karlsruhe | 620.2 | 05:42 |
| Ettlinger StraRe | AS Karlsbad | 626.3 | 05:46 |
| OchsenstraRe | | 626.9 | 05:46 |
| Weinbrenner StraRe | | 628.8 | 05:49 |
| Pforzheimer Stra6.e | Karlsbad | 629.9 | 05:52 |
| HauptstraRe | Karlsbad | 629.9 | 05:53 |

NAVIGATION SYSTEM WITH VOICE OUTPUT CONTROL

RELATED APPLICATIONS

This application claims priority to European Patent Application Serial No. 03024968.4 filed on Oct. 29, 2003, which is incorporated into this application by reference in its entirety.

BACKGROUND OF THE INVENTION

1. Field of the Invention

The invention relates to a navigation system for a vehicle comprising a voice output for outputting driving indications to a predetermined destination and/or for informing the user of the navigation system of any other operation of the navigation system. The invention particularly relates to an improved control of the voice output of the navigation system and to a method related to the improved control of the voice output.

2. Related Art

Navigation systems can determine a route from a specified starting location to a predetermined destination and can guide a traveler along the route. The user of the navigation device is guided along the route to the predetermined destination by different mechanisms. The driver can be informed acoustically by voice output that informs the driver how to follow the route. Furthermore, the driver is informed by optical signs, e.g., arrows that indicate the directions the user has to take. Another possibility for informing the driver is the representation of the position of the vehicle on a street map.

When an acoustical output is used, navigation systems normally have three different kinds of voice outputs. First of all there is an advance notice that there will be a maneuver to follow the indicated route (e.g., soon you will have to turn right). In a second step there is an announcement like "turn right after 100 m". When the driver has arrived at the position where he or she has to turn, another announcement is made ("turn right"). These voice outputs of the navigation system can be disturbing for the user of the vehicle, so that in the case when the user drives on a well-known route, he or she will not use the navigation system as the various voice outputs can be annoying for the user of the vehicle. This leads to the fact that the navigation system is not used in well-known areas or on well-known routes. However, the navigation system could be helpful even on well-known routes, as the navigation system could provide information about traffic jams, e.g., via TMC messages, and could inform the driver that another route should be used.

Furthermore, the voice output of the navigation system can be enabled or disabled manually by pushing a button. Nevertheless, the manual enabling or disabling of the voice output does not overcome the above-mentioned deficiencies, so that navigation systems are not used on routes or in areas the driver knows quite well.

Therefore, there is a need for improving the control of the voice output in navigation devices.

SUMMARY OF THE INVENTION

According to one example embodiment of the invention the navigation system for a vehicle according to the present invention comprises position detecting means for detecting the position of the vehicle, route storage means for storing a route description to a predetermined destination, voice output means for outputting driving indications by voice output and/or for informing the user of the navigation system of any other operation of the navigation system by voice output, control means for controlling the voice output means, and a presetting means for presetting a condition under which the control means enable or disables the voice output of the voice output means. With the use of the presetting means the driver of the vehicle can determine a condition under which a control means automatically enables or disables the voice output of the voice output means. It is not necessary any more that the user of the navigation system pushes a button for enabling or disabling the voice output. Therefore, the bothering voice outputs can be eliminated depending on the condition which was preset by the user of the vehicle or by any other third person. The route storage means may also be a route calculating means for calculating the route when both means are incorporated in one physical unit, as it is the case in on-board navigation systems. In off-board systems (e.g. PDA) the route may not be calculated within the system, but only stored thereon.

According to another example embodiment the preset condition is a geographical position of the vehicle, detected by the position detecting means. Due to this feature the user of the vehicle can use a geographical position of the vehicle in order to tell the navigation system whether driving indications should be output or not.

Furthermore, the control means may enable or disable the voice output depending on the fact whether the position of the vehicle matches with a predetermined area which was determined by the user of the navigation system. The driver can in advance determine a certain area, e.g., the city in which he or she lives and can preset the condition by the presetting means in that way that the voice output is only enabled when the vehicle leaves the predetermined area. If the traveler is traveling in an unknown area, the voice output can help the traveler to find the right way.

According to another example embodiment the control unit may enable or disable the voice output depending on the fact whether the geographical position detected by the position detecting means is within a preselected kind of landscape. The user of the navigation system can program the navigation system in such a way that the voice output is only enabled within the preselected kind of landscape and is disabled when the vehicle is leaving the preselected kind of landscape (e.g. a built-up area, mountains, deserts, etc.). However, the user of the navigation system could also tell the navigation system to disable the voice output within the preselected kind of landscape and to enable it on the outside of the preselected kind of landscape.

According to another embodiment of the invention the control means may enable or disable the voice output for a predetermined section of the route to the predetermined destination. It may be the case the driver has determined a route to a predetermined destination and knows one section of the route very well. Therefore, the user may wish that the navigation system does not output any driving indications by voice in the well-known section of the route, whereas the driver is glad to have the voice output in the other part of the route, which he or she does not know very well.

According to another embodiment of the invention the control means may enable or disable the voice output depending on the road on which the user of the navigation system is driving. Therefore, the presetting means is programmable in such a way that the control means enables or disables the voice output depending on the fact whether the user uses a preselected kind of road. It may be helpful to get driving indications by voice in small streets with many crossings, but it may be preferable not to have voice outputs when the user of the navigation system is driving, e.g., on a highway or a freeway. On highways or freeways the voice output may be separated by large time slices, so that a voice output indicating a gateway may be surprising for the driver.

According to another embodiment of the invention the control means enables or disables the voice output depending on the content of the voice output. In this embodiment the presetting means is not preset depending on a geographical position as explained, but depending on a condition depending on the content of the voice output. It should be understood that the geographical position condition could also be combined with the content condition, i.e. the user of the navigation device can tell the navigation system to output driving indications or any other information depending on the geographical position of the vehicle and depending on the content of the voice output.

By way of example the control means may enable or disable the voice output depending on the fact that the voice output contains the information that a new route to the predetermined destination has been calculated. The user of the navigation system may have disabled the voice output of the navigation system. In the case that a new route has been calculated due to traffic information received by the navigation system, the user of the navigation system will be informed orally by voice output indicating that a new route has been calculated. The user is then informed that the navigation system may indicate another route as previously set.

According to another embodiment the control means may enable or disable the voice output depending on the fact that the voice output contains the information that a change of direction is approaching, the announcement of this change of direction itself at the position of the change of direction being suppressed. As mentioned in the introductory part of the description, each maneuver of the navigation system is announced three times (a turn is upcoming, turn right after 100 meters, turn right now). This triple announcement can be avoided when the user of this navigation system programs the condition in the presetting means in such a way that, e.g., only the announcement "turn right after 100 meters" will be output by voice, or that any other of these three announcements will be output, the others being suppressed. This may particularly be helpful in areas or for routes, the driver of the vehicle knows quite well, so that it is not necessary to inform the user of the next driving direction three times.

The control means of the navigation system may also enable or disable the voice output depending on the traffic situation around the vehicle. When the navigation system receives traffic related information (e.g. TMC messages) the traffic information can be used as a determining factor for the enabling or disabling of the voice output. For example, the voice output may be disabled in the case that the vehicle is in a traffic jam or in a construction site.

Another possibility for a preset condition is the weather condition around the vehicle. This means that the voice output is enabled or disabled depending on the weather condition around the vehicle. The voice output may be enabled or disabled in the case of rain or fog, etc. Therefore, a navigation system may receive a signal from a weather sensor installed in the vehicle.

Another possibility of a preset condition is the vehicle speed. The control means may enable or disable the voice output above or below a predetermined speed. The user of the navigation system may choose that the voice output is disabled when the vehicle travels at high speeds or at low speeds.

Furthermore, the voice output may be disabled or enabled depending on the driver of the vehicle. If different users or drivers use the same vehicle, the vehicle and, therefore, the navigation system may recognize a driver A or a driver B due to their personalized car keys. When one specific user starts the vehicle, the navigation system knows which driver is using the vehicle, so that the navigation system may enable or disable the voice output depending on the person of the user.

A further possibility is the enabling or disabling of the voice output depending on the actual time or date. The voice output may be enabled during the night when it is more difficult to follow a predetermined route and may be disabled during daylight. However, any other possibility depending on time or date may be envisaged.

The invention further relates to a method for controlling the voice output of a navigation system in a vehicle, the method comprising the following steps: the user of the navigation system is guided to a predetermined destination by voice output and/or the user of the navigation system is informed of any other operation of the navigation system by voice output. Additionally, the voice output can be enabled or disabled by a control means and, according to the invention, a condition is preset under which the control means disables or enables the voice output. With this method the voice output can be controlled by presetting a condition under which the voice output is automatically enabled or disabled.

According to a further embodiment the geographical position of the navigation device is detected and a route to a predetermined destination is calculated, wherein the preset condition is the geographical position detected by the navigation system. The user of the vehicle can now enable or disable the voice output depending on the geographical position of the vehicle.

A method according to the invention may further comprise the step of comparing the detected position to street map data, and detecting what kind of road the user of the navigation system is using. Depending on the result what kind of road the vehicle is using, the voice output can be enabled or disabled in dependence of the used road. By way of example the user can enable the voice output when driving in a built-up area and/or can disable the voice output when traveling on a highway or a freeway where it is easier to find the right way, so that a voice output for indicating the direction is not needed.

Furthermore, the driver of the vehicle can determine a geographical area for which the voice output should be enabled or disabled. This can be achieved by comparing the detected position of the navigation device to the determined geographical area and by enabling or disabling the voice output depending on the fact whether the detected position of the navigation system lies within or outside of said geographical area. The user of the navigation system is able to set up the navigation system depending on the geographical area. This geographical area can, e.g., be chosen on a map by the user of the navigation system. The user can choose this area by using a curser and by selecting a certain part of the map as an area for which the voice output should be disabled or enabled. Furthermore, the area can be selected via a touch screen or by voice input.

Another possibility of configuring the navigation system comprises the step of analyzing the content of the voice output and enabling or disabling the voice output in dependence of the analyzed content. As mentioned above, it is possible to program the navigation system, so that only certain details of driving indications or of any other information given to the user can be chosen to be output by voice.

According to a further embodiment, the user can also disable or enable the voice output for a predetermined section of the route, which was calculated to the predetermined destination.

In conclusion, according to the present invention the voice output can be controlled in an effective way and the navigation system can be preset in such a way that voice outputs will only occur when it is desirable for the driver of the vehicle. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
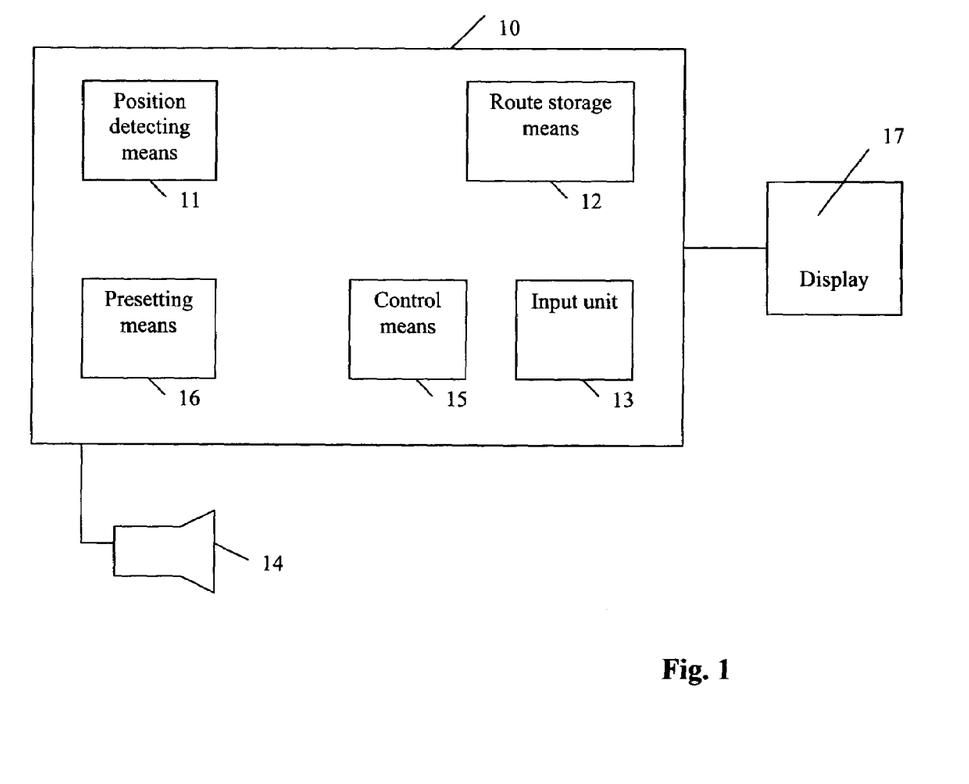
FIG. 1 shows a navigation system for controlling the voice output.

FIG. 1 shows a navigation system 10. The navigation system 10 comprises a position detecting means 11. This position detecting means 11, i.e., position detector, could comprise a GPS receiver for receiving the GPS signals for calculating the position of the vehicle. The position detecting means 11 can also receive signals from a gyroscope and/or from the vehicle shaft in order to determine the distance the vehicle has moved. It should be understood that the position detecting means 11 could comprise all possible devices for detecting the position of the navigation system 10, and therefore of the vehicle (not shown) in which the navigation system 10 may be incorporated. Position detecting means are present in all state of the art navigation systems, so that their functions are not described in further detail.

The navigation system 10 further comprises a route storage means 12 for storing a route to a predetermined destination. This route storage means 12 may also be used as a route calculating means for calculating a route to the predetermined destination. The destination for which the user of the navigation system 10 is heading could be input into the navigation system 10 by an input unit 13, the destination could also be loaded via an interface and a wireless communication network such as the internet (not shown). For informing the driver of the calculated route the navigation system 10 comprises a voice output means 14, e.g., a loudspeaker which could be part of an audio system incorporated in the vehicle. For controlling the voice output means 14 the navigation system 10 further comprises a control means 15. Furthermore the navigation system 10 comprises presetting means 16 such as a selection device for presetting a condition under which the control means 15 controls the voice output of the voice output means 14. This preset condition can be determined by the user of the vehicle or by any other person. The preset condition could, e.g., be input into the navigation device 10 via the input unit 13. The preset condition can also be stored on a storage medium (not shown) of the navigation device 10, so that the navigation system 10 can use the preset condition for determining whether the voice output should be disabled or not. Therefore, the user need not input the preset condition into the navigation system 10 every time the system 10 is used.

It should be understood that the navigation system 10 may comprise many other features, such as a display 17 or many other devices not shown in FIG. 1 which are incorporated in state of the art navigation systems, but which are not necessary for the understanding of the invention, so that a description thereof is omitted for the sake of clarity.

Figure 2:
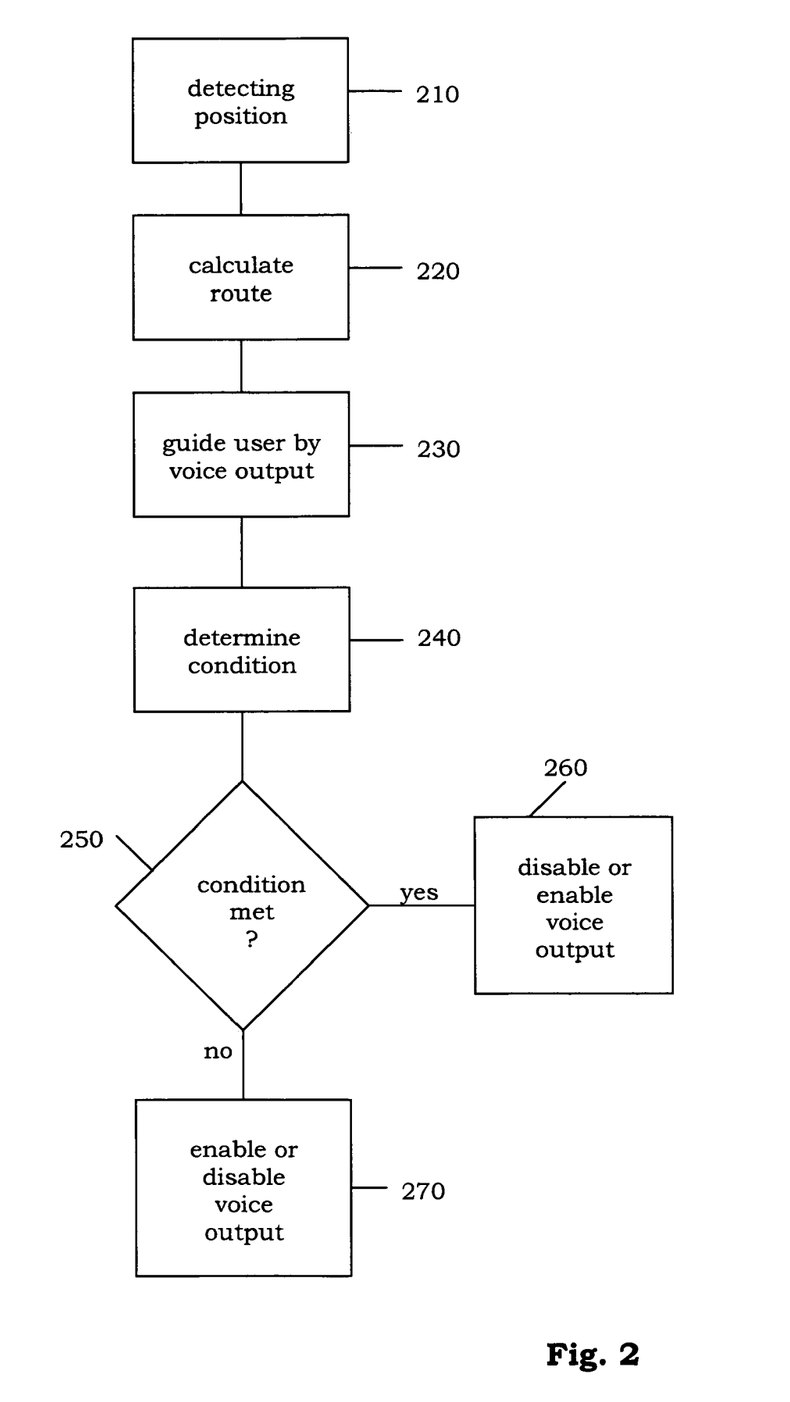
FIG. 2 shows a flowchart for controlling the voice output of a navigation system.

FIG. 2 shows the different steps for controlling a voice output via the voice output means 14. In a first step 210 the position of the vehicle is detected by the position detecting means 11. In the next step 220 the route to a predetermined destination is calculated. The predetermined destination could be input into the navigation system 10 by the use of the input unit 13. In the next step 230 the driver is guided to the predetermined destination by indicating the driving direction by voice output, and/or the user of the navigation system 10 is informed of any other operation of the navigation system 10 by voice output (e.g., "the route will be calculated"). However, before the voice is output via the voice output means 14, in step 240 the condition is determined under which the control means 15 enables or disables the voice output. The preset condition was preset by the presetting means 16. In step 250 it is asked whether this preset condition is met or not. If the condition is met, the voice output is disabled or enabled depending on the commands given by the user of the navigation system 10 and stored on the storage medium. By way of example the voice output is disabled in step 260, if the condition is met. If it is determined in step 250 that the preset condition is not met, the voice output may be enabled in step 270 or vice versa.

Figure 3:
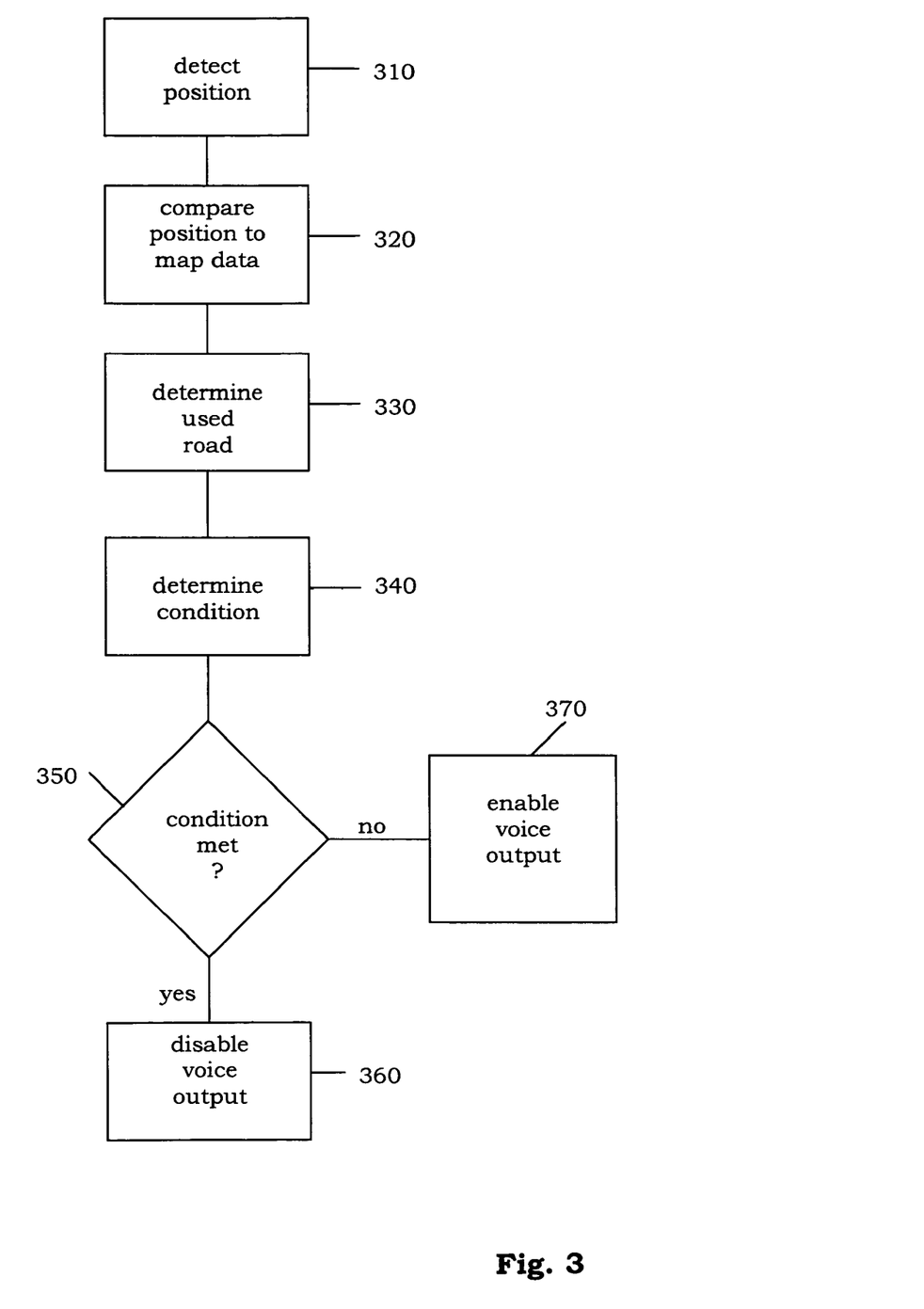
FIG. 3 is a further flowchart showing another embodiment for controlling the voice output.

In FIG. 3 a method for controlling the voice output is shown in further detail. As in FIG. 2 the position is detected in a first step (step 310). In the next step 320 the position of the vehicle is compared to map data, which is normally stored on the navigation device 10. By using the calculated position of the vehicle and the street map data it can be determined in step 330 what kind of road the driver of the vehicle is using. In step 340 the condition under which the control means 15 enables or disables the voice output is determined. By way of example, the preset condition comprised in the presetting means 16 may depend on whether the driver uses a highway or a freeway. Therefore, it is determined in step 350 whether the vehicle is driving on a highway or a freeway. If this is the case, the voice output is disabled in step 360, and if the vehicle is not driving on a highway or a freeway, the voice output is enabled, so that the user of the navigation system 10 is informed about the driving indications output by the navigation device 10 orally (step 370). With the steps shown in FIG. 3 the voice output can be controlled depending on the type of road the vehicle is using. The voice output can be disabled or enabled for specific kinds of roads.

The predetermined condition determined in step 240 in FIG. 2 and in step 340 in FIG. 3 may also comprise the following conditions: enabling or disabling the voice output depending on the traffic situation around the vehicle when the vehicle receives traffic related information, enabling or disabling the voice output depending on the weather condition around the vehicle, in the case that a weather sensor detects the actual weather around the vehicle, enabling or disabling the voice output depending on the vehicle speed, depending on the driver and/or depending on the time.

Figure 4:
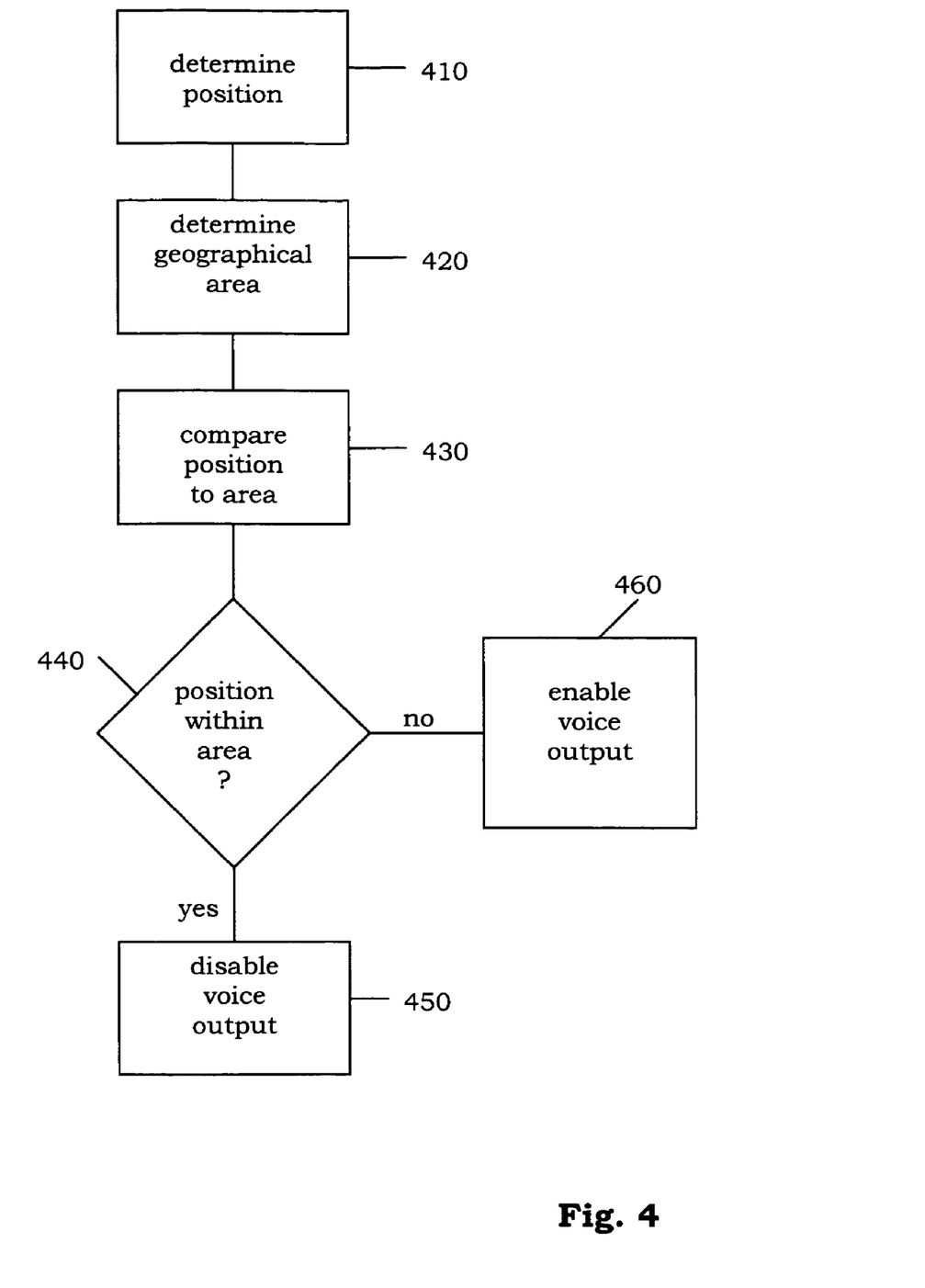
FIG. 4 shows a flowchart for controlling the voice output in which the preset condition is a geographical position.

In FIG. 4 another embodiment for enabling or disabling the voice output is shown. As before, the position is determined in step 410. In the next step 420, the user of the vehicle can determine a geographical area. In dependence of this geographical area the user of the navigation system 10 wants to be informed which direction to take, with or without voice output. This may be the case when the driver of the vehicle knows a certain geographical area, such as his or her hometown, very well, so that the driver does not want to be informed by voice output every time a driving indication is made by the navigation system 10. Nevertheless, the user of the navigation system 10 prefers to use the navigation system in his or her hometown, as the navigation system 10 can process traffic-related data for calculating the shortest route to a predetermined destination and can, therefore, consider traffic jams or closed roads. In step 430 the position detected by the position detecting means 11 of the navigation system 10 is compared to the geographical area determined in step 420. In the next step 440 it is asked whether the detected position is within the geographical area. If this is the case, the voice output is disabled in step 450. If the detected position is not within the geographical area, the voice output is enabled in step 460, so that the driver can hear the driving indications given by the navigation system 10. This means that the driver is outside the predetermined area and the vehicle is moving in another area which the driver does not know very well. In this situation the driver will be guided by the voice output of the navigation system 10. It should be understood that the navigation system 10 can also use the geographical area in such a way that the voice output is only enabled within the determined geographical area and disabled when the vehicle is moving outside of said geographical area.

Figure 5A:
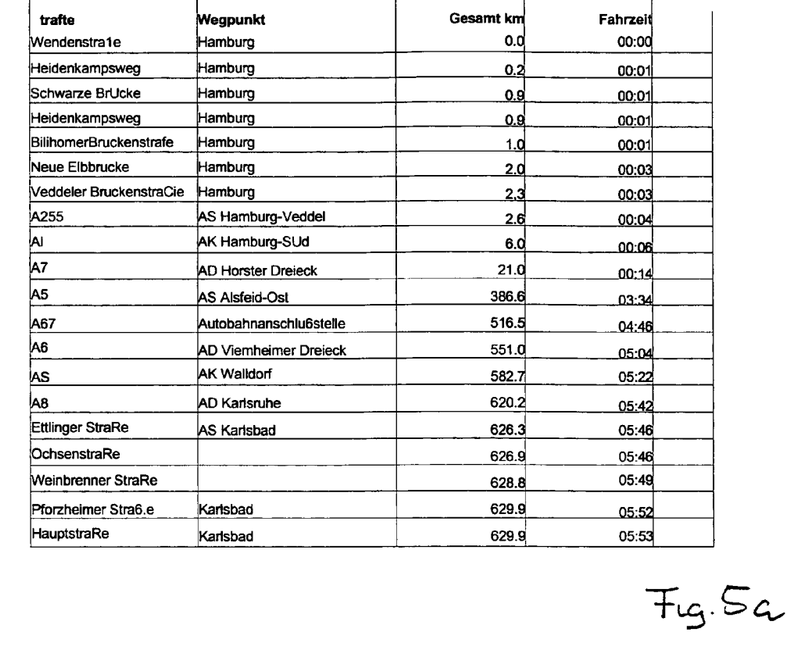
FIGS. 5a and 5b are examples for choosing a geographical area in dependence of which the voice output should be controlled.
Figure 5B:
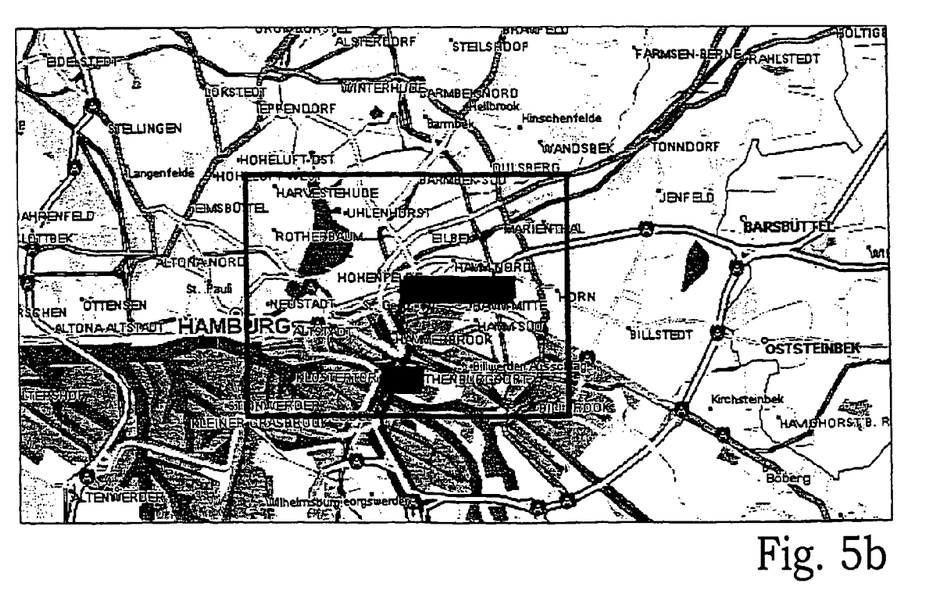

In FIGS. 5a and 5b different embodiments for determining the geographical area for which no voice output or for which a voice output is desired are shown. In FIG. 5a a list of coordinates is shown, comprising all the targets for a way from the town of Hamburg to the town of Karlsbad. As shown in FIG. 5a the user of the vehicle can preset the presetting means 16 by choosing a certain part of the route, for which no voice output is needed. In the present example the user of the navigation system 10 is not interested in having a voice output until the position "AS Hamburg-Veddel". This can also be seen by the cancelled loudspeaker sign in the right column of the Table. The user of the navigation system 10 may preset this condition, since he or she knows the city of Hamburg very well, so that no voice output is needed. As soon as the city of Hamburg at the position of "Hamburg-Veddel" has been left, the voice output is enabled and the driver will be informed by the loudspeaker of the navigation system 10.

In FIG. 5b another embodiment for setting the condition under which the control means 15 enables or disables the voice output is shown. In FIG. 5b a part of a map is shown which is typically used in navigation systems nowadays. Instead of choosing certain targets or positions of the route, the user of the navigation system 10 could also determine an area of the map, for which no voice output is desired or for which a voice output is desired. This selection of an area may be done by a touch screen or by a curser shown on the map.

Figure 6:
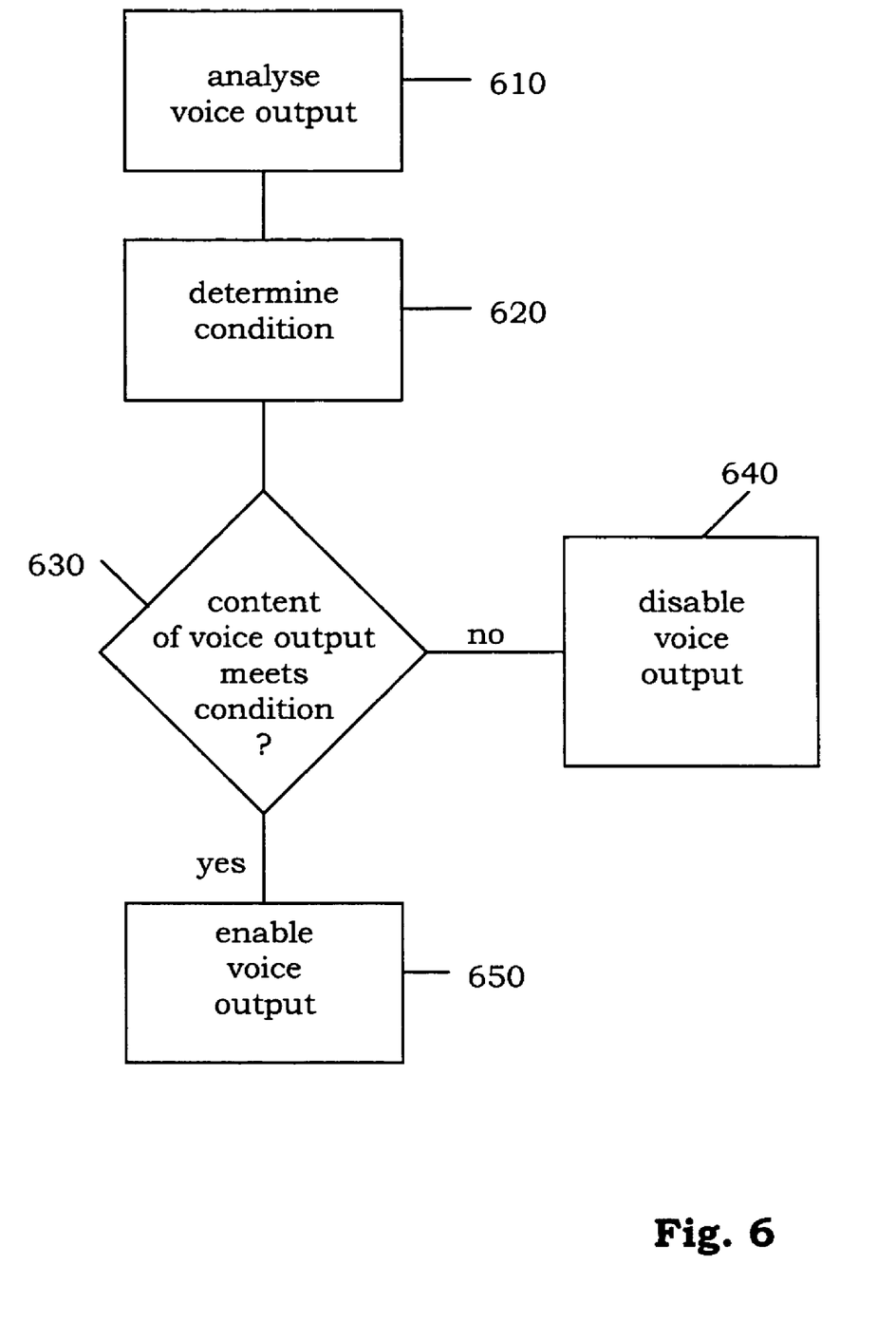
FIG. 6 shows a flow chart for controlling the voice output, in which the voice output is controlled depending on the content of the voice output.

In FIG. 6 another embodiment for controlling the voice output is shown in further detail. In this embodiment the determination of the position of the vehicle is not necessary. Only the content of the voice output will be analyzed in order to determine whether the voice output is enabled or disabled. Before outputting information to the driver, the content of the voice output is analyzed in step 610. In the next step 620 the preset condition of the presetting means 16 is determined. In step 630 it is determined whether the content of the voice output meets the preset condition. The preset condition may be the condition of enabling any voice output comprising information about the operation status of the navigation system 10, such as "the route is calculated", "a new route is calculated", etc., whereas all driving indications "turn left", "turn right", "continue straight ahead" are disabled. If it is determined in step 630 that the voice output comprises a driving indication, the voice output is disabled in step 640. If it is determined in step 630 that the voice output comprises any other information and no driving indications, the voice output is enabled in step 650.

According to another embodiment the voice output is analyzed in step 610.

The determined condition in step 620 depends on the content of the driving indication to be output to the driver. By way of example this means that the information that a change of direction is approaching within several meters will always be output, the announcement of this change of direction itself (turn right, turn left) at the position of that change of direction being suppressed. With this embodiment shown in FIG. 6 the driver of the navigation system 10 can tell the navigation system 10 that only part of the voice commands with driving indications should be output. This may be helpful, if it is considered that only one voice output for guiding the driver is enough, and not three as discussed above. The user can choose the information comprising the driving indication which should be output to the driver.

The embodiment shown in FIG. 6 can also be combined with the embodiment shown in the other Figures.

The navigation system 10 can, e.g., be programmed in such a way that only one voice output comprising driving indications will be generated in a predetermined area, whereas outside of this area two or three voice outputs comprising driving indications (soon you will have to turn right, turn right after 100 m, turn right now) will be output for one change of direction.

However, different other combinations of the embodiments shown can be envisaged.

As used in this application, a 'controller' may mean any control means, such as a microprocessor, microcontroller, or digital signal processor, to name but a few examples, or other control mechanisms embedded in hardware and/or software known by those skilled in the art. A 'memory' may mean any route storage means, such as RAM, ROM, SDRAM, EPROMs, EEPROMs or other type of device for storing digital data known to a person skilled in the art. Further, a memory may also include a Compact Disk (read-able, writeable, or rewriteable), Digital Video Disk (read-able, writeable, or rewritable). A 'speaker' may mean any voice output means or any type of device known by those skilled in the art that is able to make a human perceptible sound, such as a traditional cone speaker, piezo electric speaker, buzzer, bell, or similar device. A 'selection device' may mean any presetting means, such as a video touch screen, mouse, voice recognition device, mechanical switches, to name but a few examples, or other mechanisms known by those skilled in the art that will allow for a user to select an option or activate or deactivate a selected feature of an electronic or computer device.

In conclusion, the invention helps to improve the control of voice output of navigation systems. Each driver or any person can determine individually what kind of information is to be output by voice or not. With the navigation system of the present invention the system will be used more often even in areas which are known to the driver, since the navigation system can be configured in accordance with the needs of its user. While various embodiments of the invention have been described, it will be apparent to those of ordinary skill in the art that many more embodiments and implementations are possible within the scope of this invention. Accordingly, the invention is not to be restricted except in light of the attached claims and their equivalents. Every embodiment described above can be combined with any one of the other embodiments described.

What is claimed is:

1. A navigation system for a vehicle having a user, comprising:
   a position detector;
   a memory for storing a route description to a predetermined destination;
   a speaker for outputting driving indications by voice output and/or for informing the user of the navigation system of any other operation of the navigation system by voice output;
   a controller for controlling the speaker; and
   a user selection device for selecting a preset condition under which the controller enables or disables the voice output of the speaker.

2. The navigation system of claim 1, where the preset condition is a geographical position of the vehicle detected by the position detector.

3. The navigation system of claim 1, where the controller changes the voice output depending on whether the position of the vehicle matches a predetermined area.

4. The navigation system of claim 3, where the controller changes the voice output depending on whether a geographical position detected by the position detector is within an area with a preselected kind of landscape.

5. The navigation system of claim 3, where the controller changes the voice output for a predetermined section of the route to the predetermined destination.

6. The navigation system of claim 3, where the controller changes the voice output in response to a preselected kind of road.

7. The navigation system of claim 6, where the kind of road is a highway or a freeway.

8. The navigation system of claim 1, where the controller changes the voice output independently of the content of the voice output.

9. The navigation system of claim 8, where the controller changes the voice output independently of the voice output of the information that a new route to the predetermined destination has been calculated.

10. The navigation system of claim 8, where the controller changes the voice output unless the voice output contains the information that a change of direction is approaching and the announcement of this change of direction itself at the position of said change of direction is suppressed.

11. The navigation system of claim 1, where the controller enables the voice output in response to the traffic situation around the vehicle.

12. The navigation system of claim 1, where the controller changes the voice output depending on the weather condition around the vehicle.

13. The navigation system of claim 1, where the controller changes the voice output depending on the vehicle speed.

14. The navigation system of claim 1, where the controller changes the voice output in response to the driver of the vehicle.

15. The navigation system of claim 1, where the controller changes the voice output in response to the actual time.

16. A method for controlling a voice output of a navigation system in a vehicle having a user, comprising the following steps:
    guiding the user of the navigation system to a predetermined destination by voice output and/or informing the user of the navigation system of any other operation of the navigation system by voice output;
    enabling or disabling the voice output by a controller; and
    receiving a user selected preset condition under which the controller disables or enables the voice output.

17. The method of claim 16, including:
    informing the user of the navigation system of other operations of the navigation system by the voice output.

18. The method according to claim 16, including:
    detecting the geographical position of the navigation system; and
    calculating a route to a predetermined destination, wherein the preset condition is the geographical position.

19. The method of claim 16, further including:
    detecting the geographical position of the navigation system;
    comparing the detected position to street map data;
    detecting what kind of road the user of the navigation system is using; and
    enabling or disabling the voice output in dependence of the used road.

20. The method of claim 18, wherein the voice output is changed depending on if the user of the navigation system is traveling on a highway or a freeway.

21. The method of claim 16, further including;
    analyzing the content of the-voice output; and
    changing the voice output based on the analyzed content.

22. The method of claim 16, further including:
    detecting the geographical position of the navigation system;
    determining a geographical area;
    comparing the detected position of the navigation device to the determined geographical area; and
    selecting the voice output if the detected position of the navigation system lies in the determined geographical area.

23. The method of claim 22, where the voice output is changed for a predetermined section of a route to the predetermined destination.

24. The method of claim 22, where the user of the navigation system chooses the geographical area based on map data.

* * * * *